United States Patent [19]

Fabrig

[11] 4,369,015
[45] Jan. 18, 1983

[54] APPARATUS FOR STACKING NOTE BOOKS OR THE LIKE

[75] Inventor: Paul Fabrig, Neuffen, Fed. Rep. of Germany

[73] Assignee: Womako Maschinenkonstruktionen GmbH, Nürtingen, Fed. Rep. of Germany

[21] Appl. No.: 197,676

[22] Filed: Oct. 16, 1980

Related U.S. Application Data

[63] Continuation of Ser. No. 959,831, Nov. 13, 1978, Pat. No. 4,268,200.

[30] Foreign Application Priority Data

Nov. 24, 1977 [DE] Fed. Rep. of Germany ....... 2752372

[51] Int. Cl.³ .......................................... B65G 57/081
[52] U.S. Cl. .................................... 414/31; 198/374; 198/404; 271/186; 414/54; 414/55; 414/85; 414/765
[58] Field of Search ...................... 414/30, 31, 54, 55, 414/85, 105, 757, 762, 764, 765; 198/374, 403, 404, 572, 577; 271/65, 176, 186; 140/92.3, 92.7, 92.93, 92.94

[56] References Cited

U.S. PATENT DOCUMENTS

| 2,523,910 | 9/1950 | Lund .................................. 414/54 X |
| 2,699,264 | 1/1955 | Bruce et al. ........................ 414/85 X |
| 2,918,852 | 12/1959 | Buccicone .......................... 414/54 X |
| 3,122,241 | 2/1964 | Lawson ................................ 414/62 |
| 3,338,431 | 8/1967 | Thedick ............................ 414/85 X |
| 3,485,387 | 12/1969 | Sickinger et al. ................... 414/773 |
| 3,545,595 | 12/1970 | Reist .................................... 198/572 |
| 3,776,404 | 12/1973 | Anastasio et al. ............... 414/31 X |
| 3,826,290 | 7/1974 | Pfaffle ............................. 198/374 X |

Primary Examiner—Leslie J. Paperner
Attorney, Agent, or Firm—Kontler, Grimes & Battersby

[57] ABSTRACT

Apparatus for stacking pads with spiral binders has a reciprocable and pivotable turn-around device which inverts each second pad of a file of equidistant pads before the pads reach a stacking platform. At the stacking station, the pads are arrested by an adjustable stop which locates inverted pads in a first position and the non-inverted pads in a second position so that the binders of successive pads in a growing stack are located at the opposite sides of the stack. The turn-around device is arrested in response to detection of the absence of pads in the path along which the pads move toward the stacking platform by a photocell which further transmits signals to the mechanism for moving the stop so that the absence of one or more pads does not affect the array of pads in the stack on the platform. A level detector monitors the height of the stack on the platform and transmits signals for stepwise lowering of the platform. The number of pads in successive stacks is counted and the counter transmits signals which actuate a device for removing fully grown stacks from the platform.

14 Claims, 4 Drawing Figures

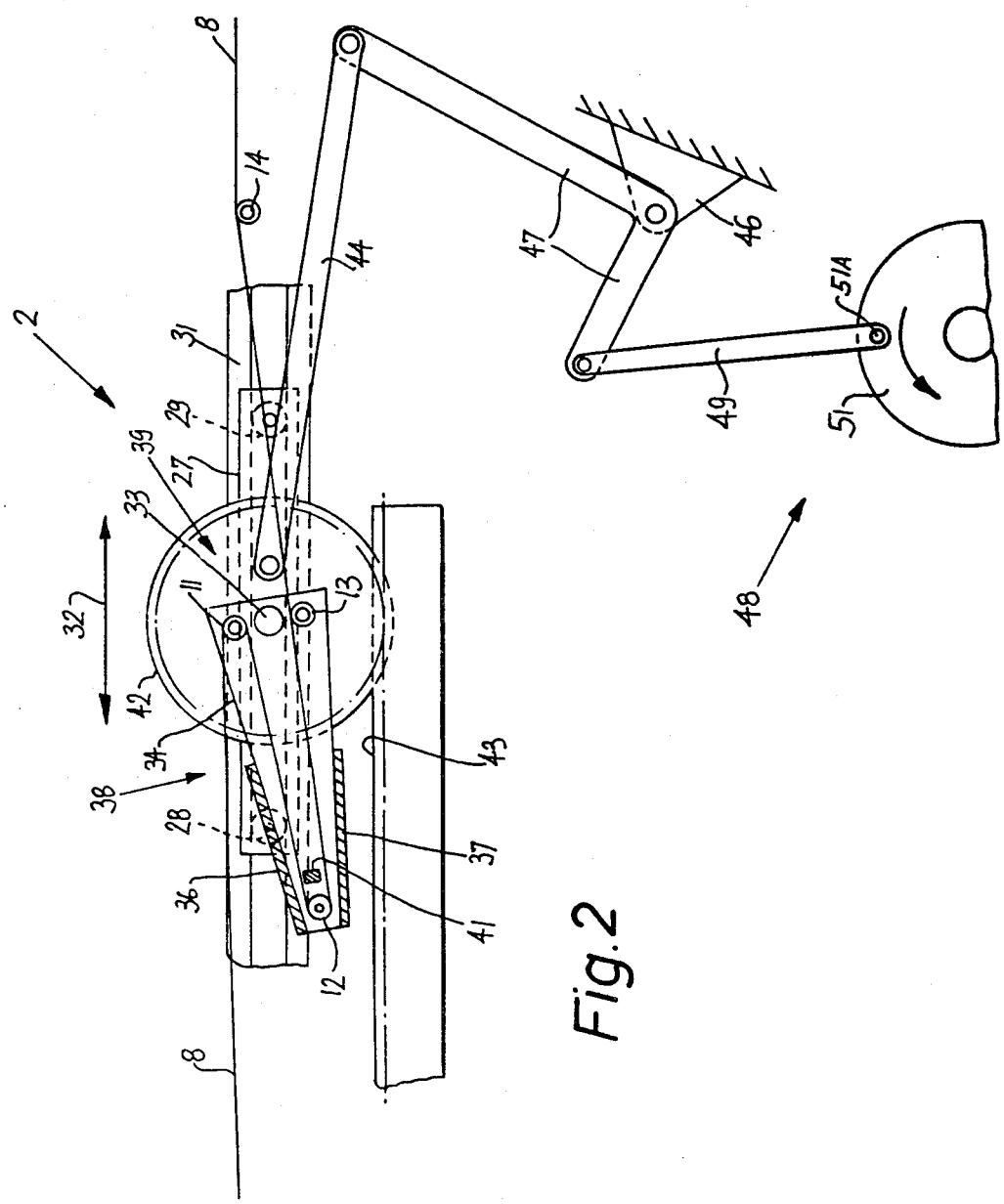

APPARATUS FOR STACKING NOTE BOOKS OR THE LIKE

This is a continuation of application Ser. No. 959,831, filed Nov. 13, 1978, now U.S. Pat. No. 4,268,200.

BACKGROUND OF THE INVENTION

The present invention relates to apparatus for accumulating stacks of note books, pads, pamphlets or analogous commodities including overlapping sheets which consist of paper or the like. More particularly, the invention relates to apparatus for stacking groups of sheets (hereinafter called pads for short) which issue from a producing or processing machine in a predetermined orientation, e.g., with their backs facing forwardly or backwards. Still more particularly, the invention relates to improvements in apparatus for stacking pads or like substantially flat commodities whose thickness is not uniform throughout so that, in the absence of remedial measures, the height of a stack would vary from one side to the opposite side of the stack.

It is known to deliver a file of pads in identical orientation to a stacking platform or table whereon successive pads are piled up on top of each other to form stacks of desired height. It is also known to equip such apparatus with stop means for arresting successive pads in a predetermined position in order to insure that each next-following pad will fully overlap the preceding pad. Fully grown stacks are transferred to a packing station or undergo further processing, for example, in a heating tunnel subsequent to introduction into envelopes consisting of shrinkable synthetic plastic material which contracts in response to the application of heat and tightly surrounds the respective stack.

The just described mode of stacking pads or the like is satisfactory as long as the thickness of each pad is constant throughout. In many instances, the thickness of at least one marginal portion of a pad exceeds the thickness of other portions, e.g., because the pad is assembled of folded sheets whose backs overlie or are placed into each other. Furthermore, the means for bonding or otherwise securing the leaves of pads to each other often or invariably contributes to greater thickness of the corresponding portion of the pad. This applies regardless of whether the sheets or leaves are held together by staples, stitches or, as in the case of certain types of steno pads, by helical or otherwise configured binders made of helically convoluted or comb-shaped metallic or plastic wire. The accumulation of a relatively small number of such pads on top of each other results in the formation of a stack whose upper surface slopes from one marginal zone toward the opposite marginal zone. Therefore, the maximum permissible height of such stacks is relatively small and the wrapping of stacks in heat-shrinkable plastic material or packing of stacks in crates, boxes or other types of containers presents many problems. A certain height cannot be exceeded because the pads of a stack are likely to overturn which can cause lengthy delays and contributes to a pronounced reduction of the output of an automatic or semiautomatic stacking apparatus.

Attempts to overcome the just discussed problems in connection with the stacking of pads of varying thickness include the accumulation of relatively small stacks and the placing of two small stacks on top of each other so that the thicker portions of pads which form one of the small stacks are adjacent to one side and the thicker portions of pads constituting the other small stack are adjacent to the opposite side of the resulting composite (higher) stack. Such procedure is acceptable when the thickness of one marginal portion of each pad exceeds only slightly the thickness of the remaining major portion of the same pad. However, the just discussed procedure is not acceptable when the leaves of pads are held together by binders whose diameters often greatly exceed the thickness of the respective pile of sheets. The accumulation of relatively low stacks wherein the binders are superimposed upon each other can result in pronounced instability of the stack and the convolutions or prongs of neighboring binders are likely to become interlaced to thus prevent orderly removal of pads from stacks. Therefore, pads wherein the leaves are held together by spirals or otherwise configured binders are normally stacked by hand. Such mode of stacking is costly and time-consuming. Moreover, it is difficult to stack the pads by hand at the same rate at which they issue from a high-speed automatic or semiautomatic machine wherein the leaves of pads are connected to each other by spirals or otherwise configured binders.

OBJECTS AND SUMMARY OF THE INVENTION

An object of the invention is to provide an apparatus which can neatly and accurately stack pads or like commodities regardless of whether the thickness of certain portions exceeds the thickness of the remaining portion or portions of such commodities.

Another object of the invention is to provide an apparatus which is especially suited for stacking of note books, pads and like commodities wherein the leaves or sheets are held together by helical or otherwise configurated binders whose diameters greatly exceed the thickness of the corresponding piles of leaves.

A further object of the invention is to provide an apparatus which is constructed and assembled in such a way that it can accumulate stacks each of which contains the same number of commodities regardless of whether or not the rate of delivery of commodities to the stacking station is constant.

An additional object of the invention is to provide an apparatus which is capable of accumulating relatively high stacks of pads or like commodities even if one marginal portion of each commodity is much thicker than the remaining portion or portions of the commodity.

A further object of the invention is to provide an apparatus which can rapidly accumulate identical stacks of pads or like commodities in a fully automatic way and wherein the upper level of each stack is horizontal or practically horizontal irrespective of variations in the thickness of commodities of which the stacks consist.

An additional object of the invention is to provide the apparatus with a novel and improved control system which monitors the delivery of commodities to be stacked and automatically regulates the operation of stacking instrumentalities when the rate of delivery deviates from normal.

An ancillary object of the invention is to provide the apparatus with novel and improved means for changing the orientation of selected commodities on their way to the stacking station.

The invention is embodied in an apparatus for manipulating substantially flat commodities, particularly for stacking pads each of which has a first portion e.g., a marginal portion containing a spiral or otherwise configurated binder) whose thickness deviates from the thickness of at least one second portion thereof. The apparatus comprises a vertically movable platform or another suitable stacking device, a set of driven endless flexible elements or other suitable means for transporting a succession or commodities in identical orientation in a predetermined direction and along a predetermined path on to the stacking device where successive commodities descend on top of each other to form a growing stack, stop means disposed above the stacking device and positioned to arrest successive commodities prior to descent onto the stacking device or on top of the growing stack on the stacking device, means for moving the stop means between first and second positions, orientation changing means (e.g., a turn-around device which can invert a commodity through 180 degrees) adjacent to the path ahead of the stacking device and being actuatable to change the orientation of selected commodities in the path, e.g., to invert each second commodity, means for actuating the orientation changing means, and control means for synchronizing the operation of the actuating and moving means so that the stop means assumes one of its positions prior to engagement with commodities whose orientation remained unchanged and the other position prior to engagement with commodities whose orientation has been changed on their way toward the stacking device. The control means preferably comprises means (e.g., shift register means or another suitable time-delay device) for operating the moving means for the stop means with a delay upon inversion of each second commodity by the orientation changing means.

The apparatus further comprises a system of endless belts or other suitable means for feeding commodities to the transporting means at regular intervals, and the control means preferably further comprises means for monitoring the path and for generating signals in response to deviation of the intervals of feed of successive commodities from the aforementioned regular intervals (i.e., in response to detection of gaps in the file of commodities which are advanced toward the stacking device). The control means then further comprises means for interrupting the operation of the moving means in response to such signals.

The actuating means for the orientation changing means may comprise a clutch, and the control means then comprises means for disengaging the clutch in response to detected absence of commodities in the path to thereby interrupt the actuation of the orientation changing means (provided, of course, that the orientation changing means was to be actuated in order to invert an oncoming commodity).

The novel features which are considered as characteristic of the invention are set forth in particular in the appended claims. The improved stacking apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged longitudinal vertical sectional view of the turn-around or orientation changing device in the apparatus of FIG. 1, the device being shown in one of its end positions corresponding to that shown in FIG. 1;

DESCRIPTION OF THE PREFERRED EMBODIMENTS

Figure 1:
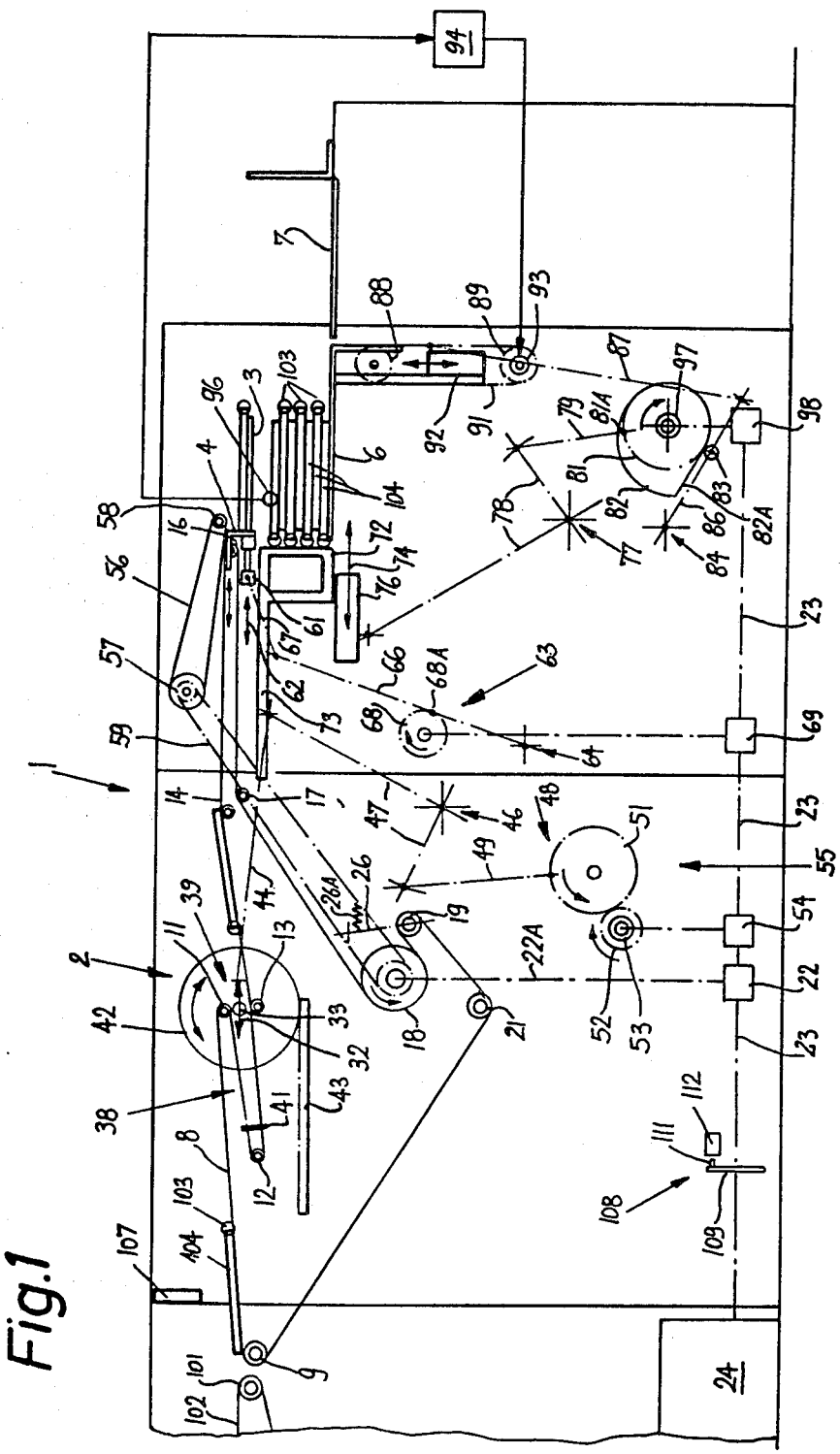
FIG. 1 is a schematic elevational view of an apparatus for stacking pads whose leaves are held together by spiral binders which embodies one form of the invention.

FIG. 1 shows an apparatus which serves to stack pads 104 of the type wherein the sheets or leaves are held together by means of spirals or analogous binders 103. The manner in which the binders 103 are introduced into the perforations of the leaves of pads 104 is disclosed, for example, in the commonly owned copending application Ser. No. 854,818 filed Nov. 25, 1977 now U.S. Pat. No. 4,161,196 granted July 19, 1979 to Paul Fabrig. Certain parts of the apparatus are denoted schematically by phantom lines; such parts include levers, links, connecting rods and similar standard parts of machines and apparatus wherein numerous components receive torque or another type of motion from a common prime mover or from two or more discrete prime movers. The apparatus comprises a composite transporting unit 1 for pads 104, a turn-around or orientation changing device 2 which inverts each second pad 104, a pad intercepting and transferring device 3 which cooperates with an adjustable stop 4 to stagger successive pads 104 preparatory to stacking, a stacking platform 6 whereon the pads 104 are accumulated on top of each other to form stacks of desired height, and a table 7 for reception of fully grown stacks of pads 104.

Figure 3:
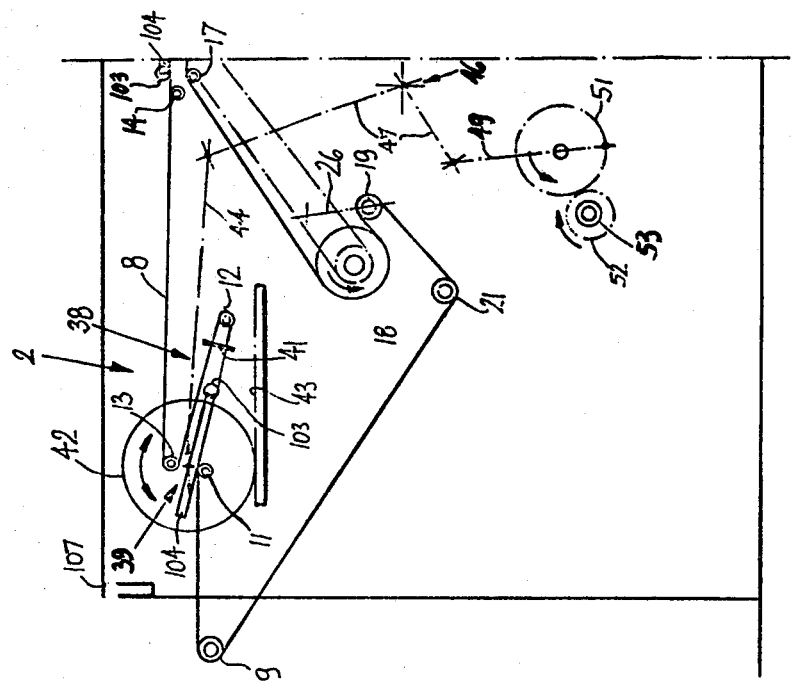
FIG. 3 is a schematic elevational view of the turn-around device in the other end position.

The transporting unit 1 comprises several endless flexible elements in the form of belt conveyors 8 which are disposed in parallel vertical planes (one behind the other, as viewed in FIG. 1) and are trained over pulleys 9, 11 to 14, 16 to 19 and 21 so as to advance along a relatively complex path a portion of which is variable and extends through the orientation changing or turn-around device 2. The pulley 18 is driven by the main prime mover 24 of the apparatus (e.g., a variable-speed electric motor) through the medium of a main drive shaft 23 and a transmission 22. The operative connection between the output element of the transmission 22 and the shaft for the pulley 18 is indicated by a phantom line 22A. The pulley 19 is adjacent to the driven pulley 18 and is mounted at the lower end of a lever 26 which is biased counterclockwise, as viewed in FIG. 1, by a spring 26A so as to tension the conveyors 8 in the region between the pulleys 18 and 21. The pulleys 11, 12 and 13 can be said to form part of the turn-around device 2 the details of which are shown in FIGS. 2 and 3.

The turn-around device 2 comprises a reciprocable carriage 27 mounted on wheels or rollers 28, 29 which are guided in or on tracks defined by a stationary guide 31 so that the carriage 27 is confined to reciprocatory movements in directions indicated by a double-headed arrow 32. The carriage 27 is provided with a horizontal shaft 33 which extends transversely of the direction of movement of pads 104 toward the intercepting device 3 and supports two pivotable arms 34 (only one shown in FIG. 2). The arms 34 are disposed at the outer sides of the two outermost conveyors 8 and are connected to each other by traverses 36, 37 so as to form therewith a swingable pocket 38 the deepmost portion of which contains the pulley 12. The pulleys 11, 13 which, too, form part of the turn-around device 2 are also mounted in the space between the two arms 34. The pulleys 11, 12 and 13 cause the belt conveyors 8 to form loops which are open at 39, i.e., between the pulleys 11 and 13 so as to provide room for entry of each second pad 104. The deepmost portions of the loops which are defined by the conveyors 8 contain a stop or abutment 41 which extends in parallelism with and in front of the pulley 12 and whose end portions are secured to the arms 34. The shaft 33 is located in the region of the opening 39, i.e., between the pulleys 11 and 13.

The means for pivoting the pocket 38 about the axis of the shaft 33 comprises a gear 42 which is fixedly secured to the shaft 33 and meshes with a stationary toothed rack 43 so that the pocket 38 automatically pivots back and forth (between the positions shown in FIGS. 2 and 3) in response to reciprocation of the carriage 27 along the guide 31.

The means for reciprocating the carriage 27 comprises a link 44 which is articulately connected to the carriage and to one arm of a bell crank lever 47 mounted in a bearing 46 so as to be pivotable about a fixed horizontal axis parallel to the axis of the shaft 33. The other arm of the bell crank lever 47 is articulately connected with a link 49 which is coupled to the eccentric pin 51A of a rotary member 51 forming part of a crank drive 48. The member 51 is or comprises a gear meshing with a smaller gear 52 shown in FIG. 1. The smaller gear 52 can receive torque from the main drive shaft 23 by way of a transmission 54 which drives the input element of an electromagnetically operated clutch 53. The radius of the gear 51 matches the diameter of the gear 52. The construction of the clutch 53 is such that its input element can engage the output element (which drives the gear 52) only after the input element completes a full revolution. The just described parts together constitute an actuating unit 55 for the turn-around device 2.

Those portions of the conveyors 8 which are located immediately ahead of the intercepting device 3 travel below the lower reaches of a set of overhead belt conveyors 56 trained over pulleys 57 and 58. The pulley 58 receives torque from the driven pulley 18 by way of a chain drive 59. The intercepting device 3 resembles a comb and is mounted on a second carriage or slide 61 which is reciprocable in directions indicated by a double-headed arrow 62, i.e., in and counter to the direction of movement of pads 104 along the path which is defined by the transporting unit 1. The means 63 for reciprocating the slide 61 and for thus moving the stop 4 between two end positions comprises a lever 66 which is pivotable about the axis of a fixedly mounted horizontal shaft 64 and is articulately coupled to the slide 61 by a link 67. The lever 66 is coupled to an eccentric pin 68A of a disk 68 driven by a transmission 69 which receives motion from the main drive shaft 23.

The stop 4 is also a comb-like member and is movable between two end positions by an electromagnet 71 (shown in FIG. 4) and a return spring 126. This stop further serves as a means for stripping successive pads 104 off the intercepting member 3. To this end, the prongs of the stop 4 extend into and can pass through the gaps between the prongs of the member 3. The stacking platform 6, too, is a comb-like structure and the prongs which form its vertical or upright wall permit the passage of prongs on a stack removing device here shown as a pusher 72 which is movable in directions indicated by a double-headed arrow 74 to transfer a fully grown stack of pads 104 from the horizontal base plate of the platform 6 onto the horizontal base plate of the table 7. The upper part of the stack removing pusher 72 constitutes an auxiliary platform 73 for the pads 104. The pusher is mounted on a carriage or trolley 76 which is reciprocable in directions indicated by the double-headed arrow 74. The means for reciprocating the carriage 76 (hereinafter called trolley to more readily distinguish from the carriage 27) comprises a bell crank lever 78 which is pivotable about the axis of a fixedly mounted horizontal shaft 77 and receives motion from a crank drive including a connecting rod 79 which is coupled to one arm of the lever 78 and to an eccentric pin 81A of a disk 81 receiving torque from the main drive shaft 23 by way of a transmission 98 and a clutch 97. The disk 81 is rigidly connected to or integral with a cam 82 whose peripheral surface is tracked by a roller follower 83 on a lever 86 which is pivotable about the axis of a fixedly mounted horizontal shaft 84. A rod 87 connects the lever 86 with an endless chain 91 which is trained over sprocket wheels 88, 89 and is coupled to a vertically reciprocable support 92 for the platform 6. The sprocket wheel 89 can be engaged by an electrically operated brake 93 which receives signals from a circuit 94 whose input is connected with a level detector 96 above the table 6.

The construction of the clutch 97 between the transmission 98 and the disk 81 (and cam 82) is such that, when engaged, the clutch rotates the disk 81 and cam 82 through one revolution and is automatically disengaged after its output element has rotated the parts 81 and 82 through 360 degrees (clockwise, as viewed in FIG. 1).

The pulley 9 for the conveyors 8 is adjacent to and located slightly downstream of a pulley 101 for a set of belt conveyors 102 which feed pads 104 from a machine of the type disclosed in the aforementioned copending application Ser. No. 854,818 or from a similar machine. For example, the conveyors 102 can deliver pads 104 directly from the station where the binders 103 are inserted into the perforations of the leaves of such pads and the end portions of the binders are bent in the customary way to form open or closed loops in order to reduce the likelihood of injury to the user and/or of entanglement of neighboring binders. As a rule, the belts 102 deliver at least one file of equidistant pads 104 in identical orientation, e.g., with the binders 103 located at the leading ends of successive pads and extending transversely of the direction of movement of the upper reaches of conveyors 102 and 8.

Figure 4:
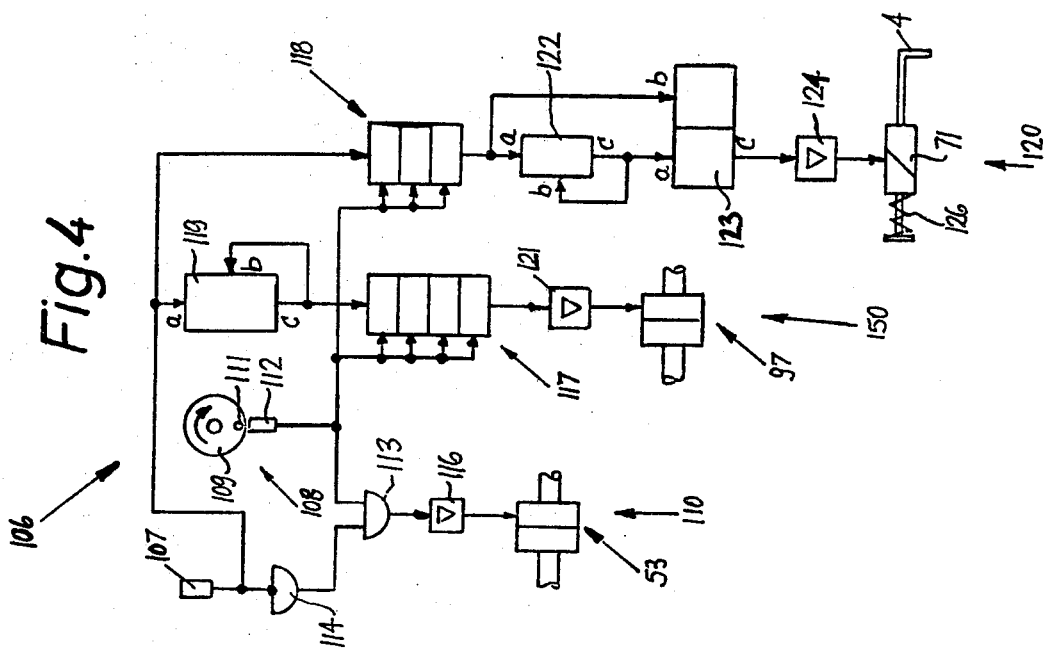
FIG. 4 is a circuit diagram of the control system in the apparatus of FIG. 1.

The control system 106 which regulates the operation of the improved apparatus by synchronizing the movements of certain parts which must be actuated in a given sequence and by interrupting the operation of certain parts in the event of a malfunction (e.g., in the absence of one or more pads in the file of pads which is normally fed by the conveyors 102) is shown in FIG. 4. This control system further comprises a signal generating device 107 (e.g., a reflection type photocell) which monitors the path of pads 104 upstream of the orientation changing or turn-around device 2, e.g., between the pulley 9 and the device 2, and whose signal generating element transmits signals to a logic circuit 114 of the type known as inverter, to a pad counter 119 and to a time-delay device 118 whenever a pad 104 advances therebelow. The control system 106 further comprises a pulse generator 108 including a disk 109 which is mounted on and is driven by the main drive shaft 23 and carries one or more magnets 111 serving to induce a proximity detector 112 to transmit a signal whenever a magnet advances therealong.

The output of the inverter 114 is connected with one input of an AND gate 113 the other input of which is connected with the proximity detector 112. The output of the AND gate 113 is connected with the clutch 53 by way of an amplifier 116. The just described parts constitute a means 110 for disengaging the normally engaged clutch 53 (i.e., a means for interrupting the operation of actuating means for the device 2) in response to detection of the absence of a pad 104 in the file of pads which is normally transported by the conveyors 102 and 8 on toward and past the turn-around device 2.

The proximity detector 112 further serves to transmit signal transporting pulses to the stages of the aforementioned time-delay device 118 and a further time-delay device 117. Each of these time-delay devices is a shift register with a predetermined number of stages. The shift register 118 forms part of a unit 120 which energizes the electromagnet 71 for the movable stop 4 at required intervals and with requisite delay following inversion of each second pad 104 or interrupts the energization of the electromagnet in response to detected absence of one or more pads, and the shift register 117 forms part of an actuating unit 150 which energizes the clutch 97 at required intervals. The first stage of the shift register 117 receives signals from the output c of the counter 119, and the first stage of the shift register 118 receives signals directly from the photocell 107; the latter further transmits signals to the input a of the counter 119. The signals which are transmitted to the first stages of the shift registers 117, 118 are transported from stage to stage by pulses which are generated by the proximity detector 112.

The counter 119 is adjustable and further comprises an erasing input b which is connected with its output c, i.e, the counter 119 is reset to zero whenever its output transmits a signal to the first stage of the shift register 117. The signal which reaches the last stage of the shift register 117 is transmitted to the clutch 97 by way of an amplifier 121.

The last stage of the shift register 118 is connected with the input a of a counter 122 whose output c transmits a signal in response to reception of two signals from the last stage of the shift register 118. The signal at the output c of the counter 122 is further transmitted to its erasing input b.

The output c of the counter 122 is connected with the dominant input a of a signal storing circuit 123 (e.g., a circuit of the type known as flip-flop) which further comprises an erasing input b connected with the output of the last stage of the shift register 118 and an output c which can transmit signals to the electromagnet 71 by way of an amplifier 124.

The movable stop 4 can constitute or is connected with the armature of the electromagnet 71 and is permanently biased to its left-hand end position (as viewed in FIG. 4) by the aforementioned return spring 126. The bias of the spring 126 is overcome (i.e, the stop 4 is caused to move to its right-hand end position) in response to energization of the electromagnet 71 via amplifier 124.

It is equally within the spirit of the invention to simplify the construction of the energizing unit 120 for the electromagnet 71. For example, this electromagnet can be energized in direct response to signals generated by a suitable device which monitors the operation of the turn-around device 2. Thus, the pocket 38 can generate a signal in one of its end positions, and such signal is transmitted with requisite delay to energize or deenergize the electromagnet 71.

The operation is as follows:

The conveyors 102 deliver pads 104 at a predetermined frequency which depends on the rate of introduction of binders 103 into the stacks of sheets or leaves to form pads 104 in the aforediscussed machine which precedes or includes the feeding conveyors 102. As a rule, the conveyors 102 deliver a file of pads wherein the pads 104 are located at a fixed distance from each other, and successive pads advance onto and with the upper reaches of the conveyors 8 by moving across the relatively narrow clearance between the pulleys 9 and 101. Successive pads 104 are detected by the photocell 107 which, as shown in FIG. 4, transmits signals to the inverter 114, to the input a of the adjustable counter 119 and to the first stage of the shift register 118. The output of the inverter 114 does not transmit a signal when its input receives a signal from the photocell 107; therefore, the output of the AND gate 113 normally does not transmit signals in spite of the fact that one input of the gate 113 receives signals from the proximity detector 112, at least once during each revolution of the main drive shaft 23. Consequently, the clutch 53 is normally engaged, i.e., the clutch remains engaged as long as the conveyors 8 receive pads 104 at regular intervals. This means that the crank drive 48 transmits motion to the carriage 27 of the turn-around device 2 whereby the latter inverts each second pad 104 but permits alternate pads 104 to pass the inverting station without any change in orientation. The crank drive 48 causes the gear 42 to roll back and forth along the toothed rack 43 so that the pocket 38 pivots back and forth in synchronism with operation of the apparatus, i.e., at the rate which is determined by the RPM of the main drive shaft 23. The arrangement is such that the openings 39 of loops formed by those portions of the conveyors 8 which are trained over the pulleys 11, 12 and 13 face an oncoming pad 104 after a pad has advanced beyond the turn-around device 2 without any change in its orientation. As shown in FIG. 3, each second oncoming pad 104 enters the pocket 38 to be arrested by the abutment 41 short of the pulley 12, and such pad is thereupon turned through 180 degrees to the position shown in FIG. 1 before it is permitted to leave the pocket 38 via openings 39 to move on toward the gap between the conveyors 8 and 56. Pivoting of the pocket 38 preferably takes place continuously, i.e., the pocket 38 can begin to pivot from the position of FIG. 3 toward the position of FIG. 1 as soon as a pad has entered its interior to an extent which suffices to insure predictable inversion. Analogously, the evacuation or expulsion of a pad 104 from the pocket 38 can begin before the pocket reaches the position of FIG. 1. The pad 104 which immediately follows an inverted pad travels over the pulley 11 when the pivoting of the pocket 38 to the position of FIG. 1 is completed or practically completed (or even while the pocket 38 begins to pivot back toward the end position of FIG. 3). All that counts is to insure that each second pad 104 is inverted and that all other pads can advance over the turn-around device 2 without any or without appreciable change in their orientation. In the embodiment which is illustrated in the drawing, the binders 103 of inverted pads 104 are located at the trailing ends of such pads and the binders 103 of non-inverted pads are located at the leading ends of the respective pads 104 (note that the binder 103 of the pad 104 which is shown in FIG. 1 immediately downstream of the pulley 9 is located at the leading end of such pad). It is clear, however, that the apparatus will operate properly if the conveyors 102 deliver pads 104 in such orientation that the binders 103 are located at their trailing ends.

The pads 104 which advance beyond the turn-around device 2 are transported by the conveyors 8 with assistance from the conveyors 56 so that they move over the stop 4 and descend onto the intercepting device 3. The latter moves back and forth (arrow 62) because it is driven by the reciprocating means 63, i.e., by the lever 66 and link 67. When the device 3 moves counter to the direction of delivery of pads 104 by the conveyors 8, it moves the intercepted pad 104 thereon against the stop 4 which arrests the pad so that the device 3 moves relative to the pad and allows the latter to descend onto the platform 6 or onto the uppermost pad of the growing stack on the platform 6. The signal which is generated by the photocell 107 on detection of the just discussed pad is delayed by the shift register 118 and reaches the input a of the counter 122 and the input b of the flip-flop 123 when the corresponding pad rests on the intercepting device 3. Since the output c of the counter 122 transmits a signal to the input a of the flip-flop 123 in response to transmission of the second one of two successive signals from the last stage of the shift register 118, the counter 122 is reset to zero and the dominant input a of the flip-flop 123 receives a signal in response to advancement of each second pad 104 past the photocell 107. Thus, the flip-flop 123 is set in response to each second signal from the photocell 107 and the signal which is stored therein is erased in response to transmission of the next-following signal from 107. The signal which is transmitted to the input a of the flip-flop 123 dominates, i.e., it is not erased in response to simultaneous transmission of a signal to the input b of 123. Thus, the output c of the flip-flop 123 transmits signals at intervals, and such signals are amplified by the amplifier 124 prior to energization of the electromagnet 71 for the stop 4. The electromagnet 71 then moves the stop, against the opposition of the return spring 126. The position of the stop 4 in energized condition of the electromagnet 71 is shown in FIG. 1. Thus, the intercepting device 3 supports a non-inverted pad 104 with the binder 103 located at the leading end of such pad and the rear edge face of the pad abutting against the stop 4. The stop 4 is located in the front end position (rightmost position) which means that the pad 104 on the device 3 is not in exact register with the uppermost pad 104 of the stack of pads on the platform 6. Consequently, when the device 3 is withdrawn to the left and allows the intercepted non-inverted pad 104 to descend, the binder 103 of such pad is located to the right of the pad 104 therebelow. In other words, the pads are neatly stacked because the binders 103 are not located between the covers or outermost sheets of the neighboring pads 104.

When the device 3 intercepts an inverted pad 104 whose binder 103 is located at the trailing end, the electromagnet 71 is deenergized and the spring 126 is free to maintain the stop 4 in the left-hand end position (i.e., to the left of the end position which is shown in FIG. 1). Therefore, when the device 3 is retracted in a direction to the left, the binder 103 of the inverted pad 104 is arrested by the stop 4 and such pad descends onto the previously deposited (non-inverted) pad in such a way that the binder 103 is located to the left of the pad therebelow. The manner in which the pads on the platform 6 are stacked is clearly shown in FIG. 1, i.e., the binders 103 of successive pads are respectively located at the right-hand and left-hand sides of the stack. The spring 126 is free to maintain the stop 4 in the left-hand end position because the signal which is transmitted to the input b of the flip-flop 123 erases the signal at the output c in response to transmission of each second signal from the photocell 107 via shift register 118.

The extent to which two neighboring pads 104 of the stack on the platform 6 are shifted with respect to each other (as considered in the direction of delivery of pads by the conveyors 8) at least equals 2D wherein D is the diameter of a binder 103. This invariably insures that the binders 103 cannot interfere with predictable stacking of pads 104 on the platform 6. In fact, all leaves of each pad 104 can be located in horizontal planes if the lowermost pad 104 of a stack on the platform 6 is an inverted pad and is deposited in such a way that its binder 103 is located to the left of the left-hand edge face of the platform 6.

The detector 96 monitors the height of the stack on the platform 6. The arrangement may be such that the detector 96 transmits a signal when it is physically contacted or closely approached by the uppermost pad 104 on the platform 6. Such signal is transmitted to the brake 93 via circuit 94 which disengages the brake for a short interval of time so as to allow the platform 6 to descend by gravity with attendant displacement of the support 92 and chain 91 (the clutch 97 is disengaged so that each release of the brake 93 enables the support 92 to descend by gravity under its own weight as well as owing to the weight of the platform 6 and the stack of pads 104 thereon). Thus, the platform 6 can descend stepwise in response to intermittent release or disengagement of the brake 93.

The desired number of pads 104 in a complete (fully grown) stack on the platform 6 is selected by appropriate setting of the counter 119. Thus, and assume that the output c of the counter 119 transmits a signal in response to reception of n signals from the photocell 107, the signal at the output c of the counter 119 resets this counter to zero (see the input b) and is further transmitted to the first stage of the shift register 117. The signal which is transmitted by the output c of the counter 119 is propagated from stage to stage of the shift register 117 by pulses which are generated by the proximity detector 112. When the signal reaches the last stage of the shift register 117, the stack on the platform 6 contains a preselected number (n) of pads 104; the amplifier 121 then energizes the clutch 97 which rotates the disk 81 and the cam 82 in a clockwise direction, as viewed in FIG. 1. The clutch 97 causes the parts 81 and 82 to complete one revolution in response to transmission or torque via main drive shaft 23 and transmission 98. The disk 81 pivots the bell crank lever 78 which causes the trolley 76 to move the stack removing pusher 72 forwardly (to the right) and back to its retracted position, whereby the prongs of the pusher transfer the fully grown stack of pads 104 onto the table 7. The level of the upper side of the base plate of the table 7 is then flush with the level of the upper side of the base plate of the platform 6 so that the lowermost pad 104 of the fully grown stack can be readily transferred onto the table 7. While the pusher 72 moves in a direction to the right, as viewed in FIG. 1, its auxiliary platform 73 receives and supports the pad 104 which is delivered during movement of the pusher from its retracted position. The thus intercepted pad 104 descends onto the platform 6 in response to retraction of the pusher 72. In the meantime, the platform 6 is lifted to its uppermost position by the cam 82 which causes the roller follower 83 and rod 87 to lift the support 92. When the roller follower 83 completes the tracking of the radially outermost point of the peripheral surface of the cam 82, the platform 6 is allowed to descend through a certain distance (due to provision of the flat 82A on the cam 82) until arrested by the brake 93 in response to a signal from the circuit 94. This will be readily appreciated since the circuit 94 transmits a signal for temporary disengagement of the brake 93 when the platform 6 or a pad thereon is sufficiently close to the detector 96. The apparatus is then ready to continue with accumulation of a fresh stack (the lowermost pad of the fresh stack is the pad which is transferred from the auxiliary platform 73 in response to retraction of the pusher 72 to its normal or starting position).

If the delivery of pads 104 is interrupted, the turnaround or orientation changing device 2 remains in the position of FIG. 1 or 3 until the next pad arrives into the range of the pocket 38, either to advance past the device 2 without inversion or to be inverted in response to rolling of the gear 42 along the toothed rack 43. This is due to the fact that the inverter 114 transmits a signal in the absence of a signal from the photocell 107 so that the AND gate 113 receives two signals (one from the inverter 114 and the other from the proximity detector 112) and disengages the clutch 53 via amplifier 116. In other words, the clutch 52 interrupts the transmission of motion from the transmission 54 to the gears 51, 52 when the path for the pads 104 exhibits a gap of excessive width, namely, a gap whose width is indicative of the fact that one or more pads are missing.

The photocell 107 also ceases to transmit signals to the input a of the counter 119 and to the first stage of the shift register 118 whenever a pad 104 is missing, i.e., the electromagnet 71 remains energized or deenergized and the stop 4 remains in its previously assumed position until the next pad moves along the path portion below the photocell 107. Since the pusher 72 is controlled by the counter 119 which, in turn, receives signals from the photocell 107, the number of pads 104 in a fully grown stack on the platform 6 is the same regardless of whether or not the delivery of pads was temporarily interrupted.

As a rule, the rate of delivery of pads by the conveyors 102 is constant, i.e., the conveyors 102 and 8 transport a file of equidistant pads 104 so that the device 2 can be actuated at regular intervals to invert selected pads, and the moving means 71, 126 for the stop 4 can be operated at regular intervals to change the position of the stop prior to or upon completion of each inverting step. This insures that successively intercepted and deposited pads 104 are properly staggered with respect to each other, as considered in the direction of transport of pads toward the stacking platform 6, i.e., that the binders 103 need not be overlapped by and need not overlap the outermost sheets or covers of the neighboring pads 104. Consequently, all sheets lie in planes which are parallel to the upper side of the base plate of the platform 6. The control system 106 synchronizes the operation of moving means 71, 126 for the stop 4 with the operation of actuating means 55 for the device 2 so that the stacks are built automatically and with a high degree of accuracy and reproducibility.

The provision of means for interrupting the operation of moving means for the stop 4 and the operation of actuating means 55 for the device 2 is desirable because the file of pads 104 which are fed by the conveyors 102 and are thereupon transported by the conveyors 8 invariably exhibits one or more gaps regardless of whether the machine which processes the pads ahead of the conveyors 8 is automatic or semiautomatic. The presence of gaps at more or less frequent intervals is attributable to many factors. For example, if the machine which processes the pads ahead of the conveyors 8 is semiautomatic, the presence of gaps is attributable to the failure of workmen to deposit finished pads at regular intervals. Furthermore, and regardless of the (automatic or semiautomatic) nature of processing machines, it is necessary or highly desirable to remove maculated pads. In the absence of means for interrupting the operation of actuating means for the device 2 and/or means for interrupting the operation of means for moving the pad 4, removal of a single maculated pad could result in the formation of a stack wherein at least two neighboring pads would have the same orientation. This would place the binders 103 of such pads into a position of overlap so that the entire stack would slope downwardly in a direction away from the immediately adjacent overlapping binders and such binders could interlock to prevent orderly removal of corresponding pads when the stack is to be broken up in a store or another establishment. Signals which are generated by the photocell 107 on detection of the absence of pad (and more accurately state those signals which are generated by the monitoring means including the photocell 107 and the associated inverter 114) are used to influence the operation of actuating means 55 for the device 2 and the operation of means 71, 126 for moving the stop 4 so that the absence of one or more pads from the file which advances toward the stacking device 6 cannot prevent a predictable stacking of successively delivered pads.

It is clear that the apparatus could be provided with two monitoring means, namely, a first monitoring means which would generate signals for transmission to actuating means for the device 2 on detection of the absence of one or more pads, and second monitoring means for generation of signals which would be transmitted to moving means for the stop 4 on detection of the absence of pads 104. However, the illustrated arrangement which employs a single monitoring means is preferred at this time because it is simpler, more compact and just as (or even more) reliable than two discrete monitoring means.

The device 2 constitutes a very simple but effective and compact means for changing the orientation of selected pads 104 of the succession of pads in the path which is defined by the conveyors 8. In certain presently known apparatus, the orientation changing device comprises a system of pulleys for a belt and means for pivoting the pulleys about a fixed axis. A drawback of such orientation changing devices is that they can operate properly (i.e., without affecting the positions of non-inverted commodities) only when the commodities are supplied at relatively long intervals and the commodities are advanced at a relatively low speed. If the speed of transport of commodities is increased, the conventional orientation changing device is likely to change the position of neighboring non-inverted commodities, e.g., in such a way that a file of discrete pads is converted into a scalloped stream wherein neighboring pads partially overlap each other. This interferes with predictable stacking of pads and renders it impossible to invariably invert each second pad of the scalloped stream. Such drawbacks of the conventional orientation changing device are attributed to the fact that the device is pivotable about a fixed axis. Therefore, if the pads of the file are close to each other, the inverted pad is invariably overlapped by the next-following non-inverted pad before the inverted pad leaves the device.

The improved orientation changing device 2 constitutes an improvement over the just described conventional devices because it renders it possible to change the orientation of each n-th (e.g., each second) pad with a heretofore unmatched degree of predictability. This is attributed to the fact that the carriage 27 for the pocket 38 is movable back and forth in and counter to the direction of transport of pads 104 along the path which is defined by the conveyors 8. Thus, the pocket 38 can move toward an oncoming pad 104 which must be inverted, and the pocket thereupon moves in the direction of transport of pads on the conveyors 8 during inversion of the pad therein. This insures that the device 2 can properly invert pads which are closely adjacent to the preceding and next-following pads and also that the pad which follows a freshly inverted pad does not overlie the latter, i.e., such pads do not form a scalloped stream. The improved orientation changing device is simple, compact and reliable. Moreover, its actuation can be readily synchronized with actuation of other units or components of the apparatus because the conveyors 8 (or more accurately stated the conveyor portions which are located between the pulleys 11, 13 and are trained over the pulley 12) form part of the device 2. The likelihood of interference between pads which are being inverted and the immediately preceding and following pads is reduced or eliminated because the pocket 38 moves counter to the direction of transport of pads on the conveyors 8 during entry of a pad into its interior and such pocket moves toward the stacking platform 6 as soon as it receives a pad, i.e., as soon as the pad therein is certain to share the pivotal movement of the pocket about the axis of the reciprocating shaft 33. Therefore, the distance between the identically oriented pads 104 upstream of the device 2 is not much different (i.e., not much more uniform) than the spacing between the alternating inverted and non-inverted pads between the device 2 and the stacking platform 6.

The placing of the axis of the shaft 33 into the region of the openings 39 (preferably substantially midway between the pulleys 11 and 13) reduces the likelihood of uncontrolled movements of pads which are received in the pocket 38. In other words, the pads remain in the pocket during inversion and are not likely to wobble or to perform other unpredictable movements while the pocket 38 pivots from the position of FIG. 1 or 2 to the position of FIG. 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. Apparatus for manipulating substantially flat commodities, particularly pads each of which has a first side and a second side and first portion whose thickness deviates from the thickness of at least one second portion thereof, comprising a stacking device; means for transporting a succession of commodities in identical orientation in a predetermined direction and along a predetermined path wherein the first portion of each commodity extends transversely of said direction and one side of each commodity is located at a level above the other side of the respective commodity, said transporting means being arranged to advance the commodities on to said stacking device where successive commodities descend on top of each other to form a growing stack, said device comprising a platform for the growing stack of commodities; stop means disposed above said device and positioned to arrest successive commodities prior to descent onto said platform; means for moving said stop means between first and second positions; orientation changing means adjacent said path ahead of said device and comprising inverting means which is actuatable to invert each second commodity of said succession in said path; means for actuating said inverting means; and control means for synchronizing the operation of said actuating means and said moving means so that said stop means assumes one of said positions prior to engagement with commodities whose orientation remained unchanged and the other of said positions prior to engagement with commodities whose orientation has been changed by said inverting means, said control means comprising means for operating said moving means with a delay upon inversion of each second commodity by said inverting means.

2. The apparatus of claim 1, further comprising means for feeding commodities to said transporting means at regular intervals, said control means further comprising means for monitoring said path and for generating signals in response to deviation of the intervals of feed of commodities from said regular intervals and means for interrupting the operation of said moving means in response to said signals.

3. The apparatus of claim 1, wherein said actuating means comprising a clutch and said control means further comprises means for monitoring said path for the presence of commodities therein and for disengaging said clutch to thereby interrupt the actuation of said inverting means in response to detection of the absence of commodities in said path.

4. The apparatus of claim 3, further comprising main prime mover means, said actuating means including means for transmitting motion from said main prime mover means to said inverting means via said clutch means while said monitoring means detects the presence of commodities in said path.

5. The apparatus of claim 3, wherein said means for operating said moving means with said delay comprises means for operating said moving means with a predetermined delay following each inversion as long as said monitoring means detects the presence of commodities in said path.

6. The apparatus of claim 1, further comprising means for removing stacks from said device and means for actuating said removing means, including counter means for the number of commodities in a stack on said device and means for moving said removing means with respect to said device when said counter means detects a predetermined number of commodities on said device.

7. The apparatus of claim 1, further comprising means for intercepting successive commodities prior to descent onto said device and means for moving said intercepting means between a first position in which said intercepting means intercepts an oncoming commodity and a second position in which said intercepting means allows the intercepted commodity to descend onto said platform or onto a growing stack on said platform, said stop means being located in the path of movement of intercepted commodities with said intercepting means to respectively arrest such commodities in first and second positions, depending on the position of said stop means.

8. The apparatus of claim 7, further comprising main prime mover means for said transporting means and means for transmitting motion from said main prime mover means to said means for moving said intercepting means.

9. The apparatus of claim 7, wherein said means for moving said intercepting means includes means for moving said intercepting means substantially in and counter to said direction.

10. The apparatus of claim 1, wherein said transporting means comprises at least one endless flexible element and said inverting means includes a pocket having an opening and movable between a first position in which said opening is located in the path of an oncoming commodity and a second position in which said opening allows the commodity to leave said pocket by moving in said direction.

11. The apparatus of claim 10, wherein said actuating means comprises means for pivoting said pocket about an axis which is substantially normal to said direction.

12. The apparatus of claim 11, wherein said actuating means further comprises means for moving said pocket in said direction during movement of said pocket from the first to the second position and counter to said direction during movement of said pocket from the second to the first position.

13. The apparatus of claim 1, wherein said pivot axis is located in the region of said opening.

14. The apparatus of claim 1, further comprising signal generating detector means for monitoring the height of the stack on said platform and means for lowering said platform stepwise in response to signals from said detector means.

* * * * *